O. SCHÖNHERR & J. HESSBERGER.
PRODUCTION OF LONG STABLE ELECTRIC ARCS.
APPLICATION FILED MAR. 16, 1906.
930,238.
Patented Aug. 3, 1909.
2 SHEETS—SHEET 1.
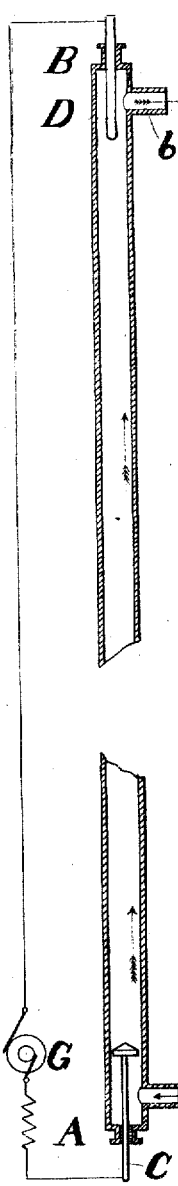
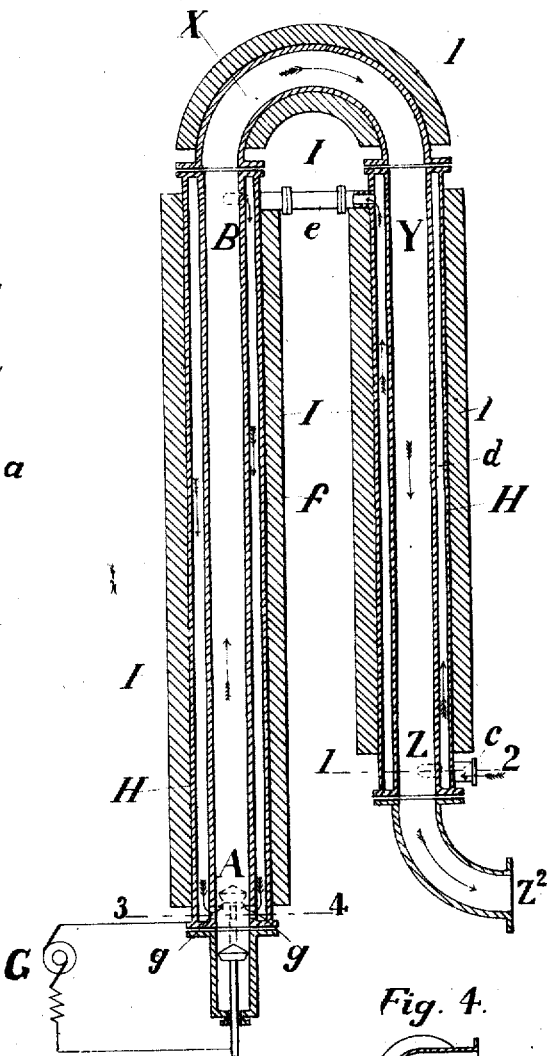
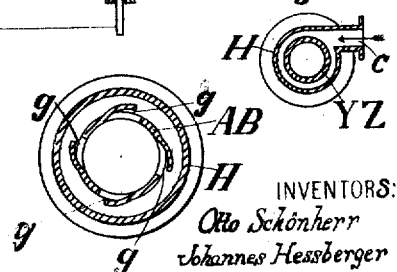
WITNESSES:
George Hulsberg
Edward Niemer
INVENTORS:—
Otto Schönherr
Johannes Hessberger
BY
W. C. Hauff
ATTORNEY

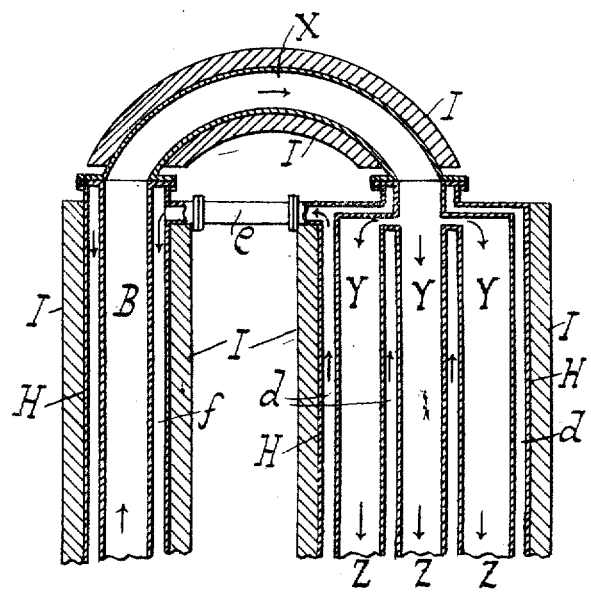
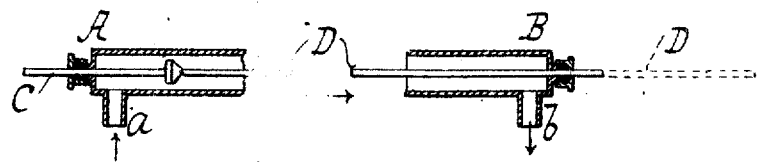

UNITED STATES PATENT OFFICE.

OTTO SCHÖNHERR AND JOHANNES HESSBERGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF LONG STABLE ELECTRIC ARCS.

No. 930,238.  Specification of Letters Patent.  Patented Aug. 3, 1909.

Application filed March 16, 1906. Serial No. 306,410.

*To all whom it may concern:*

Be it known that we, OTTO SCHÖNHERR, doctor of philosophy and chemist, subject of the King of Saxony, and JOHANNES HESSBERGER, a subject of the King of Prussia, electrician, residing at Ludwigshafen-on-the-Rhine, in the Kingdom of Bavaria, German Empire, have invented new and useful Improvements in the Production of Long Stable Electric Arcs, of which the following is a specification.

This invention consists of means whereby stable electric arcs of exceptional length can be produced by but moderately high electromotive forces.

In carrying out this invention, an electrode, connected with one pole of a source of electricity, is inserted in a tube, or passage, at, or toward, one end thereof, and is insulated therefrom and the other pole of the source of electricity is connected with the tube, or passage, itself, or with a special electrode, at, or toward, the other end of the said tube, or passage, and a current of air, or other gas, is passed through the said tube, or passage, with such velocity that a long and steadily burning electric arc is produced and maintained.

The following description and examples will further explain the nature of our invention and how it can be performed, but it is not limited to the precise method and details hereinafter given.

An electrode connected with one pole of a suitable source of electricity is inserted in one end of a tube, but is insulated from the said tube, the tube itself being connected with the other pole of the source of electricity, and a quick current of air, or other gas, is blown through the tube, preferably with a whirling motion, commencing at the end at which the aforementioned electrode is inserted. The whirling motion may be obtained by blowing the air into the tube tangentially. In this way, for instance, with an electromotive force of only a few thousand volts an arc can be obtained as much as three (3) yards long and burning steadily in the axis of the tube. As soon as the arc burns steadily, the quickly moving air, or other gas, prevents the arc from springing at once to the side and thus passing into the walls of the tube, this taking place at a distance of several yards from the electrode.

If convenient, the arc can be directed against another special electrode which may be cooled by water for instance, and which is placed in the tube, and in this case the tube only acts provisionally as an electrode, although it may subsequently remain electrically connected with the other pole of the source of electricity. When this arrangement is employed, the electric arc, as it is first formed, springs from the first electrode and terminates in an adjacent part of the wall of the tube, the termination is, however, driven forward along the wall of the tube by means of the current of air, or other gas, until it reaches the second electrode. When this point is reached, the electric arc burns quietly in the axis of the tube, starting from the center of the first electrode and terminating at the second electrode.

When the electric arc terminates not at a special second electrode cooled as aforesaid, but at any part of the wall of the tube, it is preferred to cool that part of the wall by means of a water-jacket, or in other convenient way, in order to prevent overheating. If desired, the tube can be formed of non-conducting material, and thus not act as an electrode, and means of creating the arc be provided; for instance, the second electrode can be arranged so that it can be moved toward, and withdrawn from, the first electrode; or a conductor may be introduced into the tube along the wall thereof, this conductor being preferably a small tube through which water passes for the purpose of cooling it, and it can be arranged spirally so that it does not to any great extent obstruct the flow of air. The conductor can be either temporarily, or permanently, connected with the other pole of the source of electricity. In this latter case the point of discharge can be made to travel along the conductor until it reaches the second electrode in a manner similar to that which is followed as described above when the tube itself is formed of conducting material.

In carrying out our invention it is not essential that the air, or other gas, pass the first electrode, as it may be introduced at a point between the two electrodes provided that means be employed for preventing the discharge from the first electrode striking the wall of the tube while the arc is in operation. This can be effected for instance, by sufficiently increasing the distance between the electrode and the wall of the tube at the part between the first electrode and the place where the air, or other gas, is admitted, or by placing insulating material between the electrode and the tube at such part. For the purpose of starting the electric arc, the first electrode can be pushed forward until the air, or other gas, passes it, in which case the discharge at first takes place between the side of the electrode and the wall of the tube, but is driven forward by the air, or other gas, and as soon as the arc is burning steadily in the middle of the tube, the said electrode can be drawn back until the air, or other gas, no longer passes it. Another method of starting the electric arc, when the first electrode remains permanently outside the current of air, or other gas, consists in bringing the second electrode toward, and then withdrawing it from, the first electrode.

Referring to the accompanying drawing, Figure 1 is a diagram to illustrate purely diagrammatically one of the simplest methods of carrying out the invention. Fig. 2 represents a convenient form of first electrode in vertical section. Fig. 3 is a vertical section of a form of the apparatus. Fig. 4 is a cross-section on the line 1—2, and Fig. 5 is a cross-section on the line 3—4 of the apparatus shown in Fig. 3. Fig. 1ª is a modification of Fig. 1, showing the means for creating the arc if the tube consists of non-conducting material. The electrode D can be moved down to touch the electrode C and subsequently moved up to the position shown by the dotted marks. Fig. 3ª is a modification of Fig. 3 showing the upper part of this figure only. In this modification instead of one tube YZ, three tubes YZ are shown and instead of the straight tube H surrounding YZ there is a single chamber H.

AB represents the tube inside which the electric arc is produced. C is the first electrode, which is insulated from the tube and connected to the pole of the source of electricity G, the other pole thereof being connected to the second electrode D which is not insulated from the tube AB. The arrows indicate the direction in which air, or other gas, which is admitted at $a$, passes through the tube AB and leaves at $b$.

Fig. 2 represents in vertical section a convenient form of the first electrode from which the electric arc springs. The said electrode is insulated from the tube AB by means of the insulating material EE. $C^2$ represents the head of the electrode C, and $C^3$ is a rod of conducting material longitudinally movable relatively to the rest of the electrode, so that the said rod $C^3$ can, as it wears away, be pushed forward either by hand, or automatically by machinery. The electrode itself is hollow and a part of the air, or other gas, entering at $a$, passes through it in the direction indicated by the arrows, for the purpose of cooling the electrode, FF representing openings, for the air, or other gas, to enter, and leave, the said electrode.

Fig. 3 represents a form of apparatus in which the heat generated and which is taken up by the air, or other gas, is used to heat the air, or other gas, before it enters the reaction tube AB, in which the electric arc is formed. This tube AB is connected by the connection X with another tube YZ which leads through the outlet $Z^2$ to an absorber. Each of the tubes AB and YZ is shown surrounded by an outer tube H and these and also the passage X are covered on the outside with material I which is a bad conductor of heat. The air, or other gas, enters at $c$ and is driven in the direction shown by the arrows, passing first up the space $d$ between the tubes YZ and H and then by the pipe $e$ into the space $f$ between the tubes AB and H, cooling the inner tubes and taking up heat itself and then entering the reaction tube AB by the openings $g$ near the first electrode.

Fig. 4 is a cross section on the line 1,2. of Fig. 3 showing how the inlet pipe is fixed tangentially to the outer tube H so that the air, or other gas, is driven around the inner tube and exercises a better cooling effect.

Fig. 5 is a cross section on the line 3,4. of Fig. 3 representing a form of inlet opening $g$ for air, or other gas, into the reaction tube AB so that the air, or other gas, has in the said reaction tube the whirling motion which is advantageous for the purpose of producing long arcs. Instead of the single outlet tube YZ, a bundle of tubes may be substituted each of which is subjected to the cooling action of the air, or other gas, which enters the apparatus so that the total cooling and preheating effect is larger than when only the single tube YZ is employed.

If desired, the heat contained by the air, or other gas, may be utilized in other ways, for instance it may be utilized in evaporating solutions of nitrates and nitrites which have been obtained from atmospheric nitrogen by the process according to our present invention, when air is the gas treated, and used to maintain the long arc as aforesaid.

Arcs produced according to our invention can, among other purposes, be used for carrying out endothermic reactions in gases, and large amounts of energy, for instance one hundred (100) kilowatts, can, by means of the arrangement described, be successfully used up in one (1) arc.

We do not in this application claim the electrodes described in this specification and illustrated in the accompanying drawings, since they are claimed in a separate application Serial No. 469,586, filed December 28, 1908, which has been divided out from the present application.

Now what we claim is:

1. The process of producing a long stable electric discharge which consists in stretching the discharge from one terminal alongside another by means of a current of fluid.

2. The process of producing a long stable electric discharge which consists in forcing one part of the discharge away from the other by a current of fluid directed alongside one of the terminals.

3. The process of producing a long electric discharge which consists in stretching the discharge by a current of fluid directed parallel with the body of the discharge.

4. The process of producing a long electric discharge which consists in stretching the same by a fluid current directed against one end thereof.

5. The process of drawing out an electric discharge which consists in forcing a gaseous envelop between it and an inclosing terminal.

6. The process of drawing out an electric discharge which consists in forcing a gaseous wall between it and a side by side terminal.

7. The process of maintaining a long electric arc which consists in maintaining an enveloping current of fluid as a shield against lateral escape.

8. The process of maintaining a long electric arc which consists in maintaining an enveloping rotating current of fluid as a shield against lateral escape.

9. The process of maintaining a long electric arc beside a conductor tube which consists in maintaining an inclosed separating current of fluid as a shield between the arc and conductor.

10. The improvement in the electrical production of endothermic reaction in gas which consists in maintaining an electrical discharge longitudinally in a current of the gas by the drawing out tendency of the gas itself.

11. The improvement in the electrical production of endothermic reaction in gas which consists in maintaining a current of the gas between an electric discharge and a side by side conductor.

12. The improvement in the electrical production of endothermic reaction in gas which consists in forcing an envelop of the gas between the discharge and a narrowly inclosing terminal.

13. The improvement in the electrical production of endothermic reaction in gas which consists in maintaining a current of the gas between an electric discharge and a side by side conductor and preliminarily heating the gas from the opposite side of said conductor.

14. The process of producing endothermic reaction in gas which consists in subjecting the gas to the influence of an arc drawn out by an enveloping current of said gas.

15. The improvement in the production of endothermic action in a current of gas by an electrical discharge longitudinally in said current which consists in prolonging the action by causing the current to lengthen said discharge.

16. The process of maintaining a long electric arc by means of a current of gas.

17. The process of producing and maintaining a long stable electric arc in a tube by causing an arc between an insulated electrode and a conductor which arc at first passes to the conductor near to the insulated electrode to travel up the tube and to be maintained when the arc is at the required length by passing a current of gas into the tube substantially as described.

18. The process of producing and maintaining a long stable electric arc in a conducting tube by causing an arc between an insulated electrode and a conducting tube which arc at first passes to the wall of the tube near to the insulated electrode to travel up the tube and to be maintained when the arc is at the required length by passing a current of gas into the tube substantially as described.

19. The process of producing and maintaining a long stable electric arc in a conducting tube by causing an arc between an insulated electrode and a conducting tube which arc at first passes to the wall of the tube near to the insulated electrode to travel up the tube and to be maintained when the arc is at the required length by passing a current of air into the tube substantially as described.

20. The process of producing a long stable electric arc by means of an electrode, connected with one pole of a source of electricity and inside and insulated from a tube or passage connected to the other pole of the said source of electricity by passing a current of gas through the said tube or passage with such velocity that a long arc is produced and maintained substantially as described.

21. The process of producing a long stable electric arc by means of an electrode connected with one pole of a source of electricity and inside and insulated from a tube or passage connected to the other pole of the said source of electricity by passing a current of air through the said tube or passage with such velocity that a long arc is produced and maintained substantially as described.

22. The process of producing a long stable electric arc between an electrode connected with one pole of a source of electricity and inside and insulated from a tube or passage having at or toward its other end a second electrode connected to the other pole of the said source of electricity and the said second electrode by passing a current of air through the said tube or passage with such velocity that a long arc is produced and maintained substantially as described.

23. An apparatus of the kind described comprising a long tube, an electrode inserted into the tube at one end portion thereof another electrode or pole at the other end portion of said tube and a blast passage for the tube.

24. An apparatus of the kind described comprising a long tube an electrode inserted into the tube at one end portion thereof and insulated therefrom another electrode or pole electrically connected with the other end portion of said tube and one or more passages or entrances for allowing a blast to be passed through the tube in the direction from the insulated electrode.

25. An apparatus of the kind described comprising a tube combined with poles or sources of electricity and means for creating a blast in said tube and placed in such a manner as to impart a whirling motion to the blast.

26. An apparatus of the kind described comprising a tube combined with poles or electrodes one of which is insulated from said tube and a passage or openings for allowing a blast through said tube and placed tangentially or at such angle as to create a whirling blast.

27. An apparatus of the kind described comprising a tube poles connected with a source of electricity means for cooling one of the poles and connections to lead to a blast generator.

28. An apparatus of the kind described comprising a tube a cooling jacket for the tube electrodes connected respectively to opposite portions of the tube and a blast connection for the tube.

29. An apparatus of the kind described comprising a tube an electrode inserted into the tube at one end portion thereof another electrode or pole at the other end portion of said tube and a blast passage for the tube one of the electrodes being movable or adjustable.

30. An apparatus of the kind described comprising a tube having an insulated entrance at one end portion an electrode inserted through said insulation a non insulated electrode at the opposite end portion of the tube and lateral blast openings.

31. An apparatus of the kind described comprising a reaction tube, means for forming an electric arc in said tube, a second tube having a connection leading to an absorber and also being connected with the first tube, a blast passage about both tubes and a communication from the blast passage to the interior of the reaction tube.

32. An apparatus of the kind described comprising a reaction tube with internal arc forming means, a tube having a connection leading to an absorber the said tube also communicating with the first tube a blast tube surrounding and spaced from the two first named tubes and a communication from the interior of the blast tube to the interior of the reaction tube.

33. An apparatus of the kind described comprising a reaction tube with internal arc forming means, a tube having a connection leading to an absorber the said tube also communicating with the first tube a blast tube surrounding and spaced from the two first named tubes and a communication from the interior of the blast tube to the interior of the reaction tube said blast tube being covered by heat retaining substance.

34. An apparatus of the kind described comprising a reaction tube with internal arc forming means a tube or plurality of tubes having a connection leading to an absorber a connection for uniting the interiors of the two tubes, a blast tube sections of which respectively surround the reaction tube and absorber tube a heat retainer about the reaction and absorber tubes and their connection and a communication between the blast tube and the interior of the absorber tube.

35. Apparatus for the production of long stable electric arcs consisting of a tube or furnace containing an electrode connected with one pole of a source of electricity and insulated from the said tube another electrode at or near the other end of the said tube connected with the other pole of the said source of electricity means for introducing a current of gas into the said tube near the first named electrode and for removing the gas treated at or near the other end of the tube all substantially as described.

36. Apparatus for the production of long stable electric arcs consisting of a conducting tube or furnace containing an electrode connected with one pole of a source of electricity insulated from the said tube being connected with the other pole of the said source of electricity means for admitting a current of gas into the tube or furnace near the said electrode and for removing the treated gas at the other end of the tube or furnace substantially as described.

37. Apparatus for the production of long stable electric arcs consisting of a tube or furnace containing an electrode connected with one pole of a source of electricity insulated from the said tube and another electrode at or near the other end of the said tube connected with the other pole of the said source of electricity and an outer tube inclosing the said tube or furnace means for admitting gas into the said outer tube and from the said outer tube into the inner tube near the first electrode and for removing the treated gas at the other end of the tube or furnace all substantially as described.

38. Apparatus for the production of long stable electric arcs in a conducting tube or furnace containing an electrode connected with one pole of a source of electricity, insulated from the said tube the said tube being connected with the other pole of the said source of electricity means for admitting a current of gas into the tube or furnace near the said electrode and an outer tube inclosing the said tube or furnace means for admitting gas into the said outer tube and from the said outer tube into the inner tube near the electrode and for removing the treated gas at the other end of the tube or furnace substantially as described.

In testimony whereof we have hereunto set our hands in the presence of two subscribing witnesses.

OTTO SCHÖNHERR.
JOHANNES HESSBERGER.

Witnesses:
J. ALEC. LLOYD,
JOS. H. LEUTE.